US008128419B2

(12) United States Patent
Nijhuis

(10) Patent No.: US 8,128,419 B2
(45) Date of Patent: Mar. 6, 2012

(54) DISTRIBUTOR DEVICE FOR USE IN COMMUNICATION AND DATA SYSTEMS TECHNOLOGY

(75) Inventor: Antony Nijhuis, Modautal-Brandau (DE)

(73) Assignee: ADC GmbH, Berlin (DE)

( * ) Notice: Subject to any disclaimer, the term of this patent is extended or adjusted under 35 U.S.C. 154(b) by 1692 days.

(21) Appl. No.: 10/579,700

(22) PCT Filed: Nov. 12, 2004

(86) PCT No.: PCT/EP2004/012815
§ 371 (c)(1),
(2), (4) Date: May 19, 2006

(87) PCT Pub. No.: WO2005/060274
PCT Pub. Date: Jun. 30, 2005

(65) Prior Publication Data
US 2007/0086709 A1    Apr. 19, 2007

(30) Foreign Application Priority Data

Nov. 25, 2003  (DE) .................................. 103 55 017

(51) Int. Cl.
*G02B 6/36* (2006.01)
(52) U.S. Cl. ........ 439/76.1; 361/800; 361/816; 257/659
(58) Field of Classification Search .................. 361/800, 361/796, 816, 752, 753, 799, 818, 72, 730; 439/76.1; 257/659, 660
See application file for complete search history.

(56) References Cited

U.S. PATENT DOCUMENTS

| 5,602,723 | A | 2/1997 | Takahashi et al. |
| 5,807,131 | A | 9/1998 | Allen et al. |
| 5,961,342 | A | 10/1999 | Daoud |
| 6,128,321 | A | 10/2000 | Bennett et al. |
| 7,270,551 | B2 | 9/2007 | Busse et al. |
| 7,518,883 | B1 * | 4/2009 | Suitor et al. .................. 361/788 |
| 7,548,434 | B2 | 6/2009 | Busse et al. |
| 2001/0004365 | A1 | 6/2001 | Lee |
| 2007/0285879 | A1 | 12/2007 | Busse et al. |

FOREIGN PATENT DOCUMENTS

| CA | 2494563 A1 | 3/2004 |
| CN | 1436384 | 8/2003 |
| DE | 102 36 361 A1 | 3/2004 |

* cited by examiner

*Primary Examiner* — Gary F. Paumen
(74) *Attorney, Agent, or Firm* — Merchant & Gould P.C.

(57) ABSTRACT

The invention relates to a distributor device for use in communication and data systems technology, comprising at least one distributor connection module. Said distributor connection module comprises a housing which houses input and output contacts, accessible from the exterior, for connecting lines, cables or wires. The distributor device comprises at least one additional connection module which comprises at least one SDH/SONET transport interface and outputs for electrical signals. The outputs of the connection module are connected to inputs of the distributor connection module. The connection module comprises at least one converter for converting SDH/SONET transport signals to E1 signals and vice versa. The invention also relates to a corresponding connection module and a corresponding distributor connection module.

27 Claims, 5 Drawing Sheets

Figure 3:
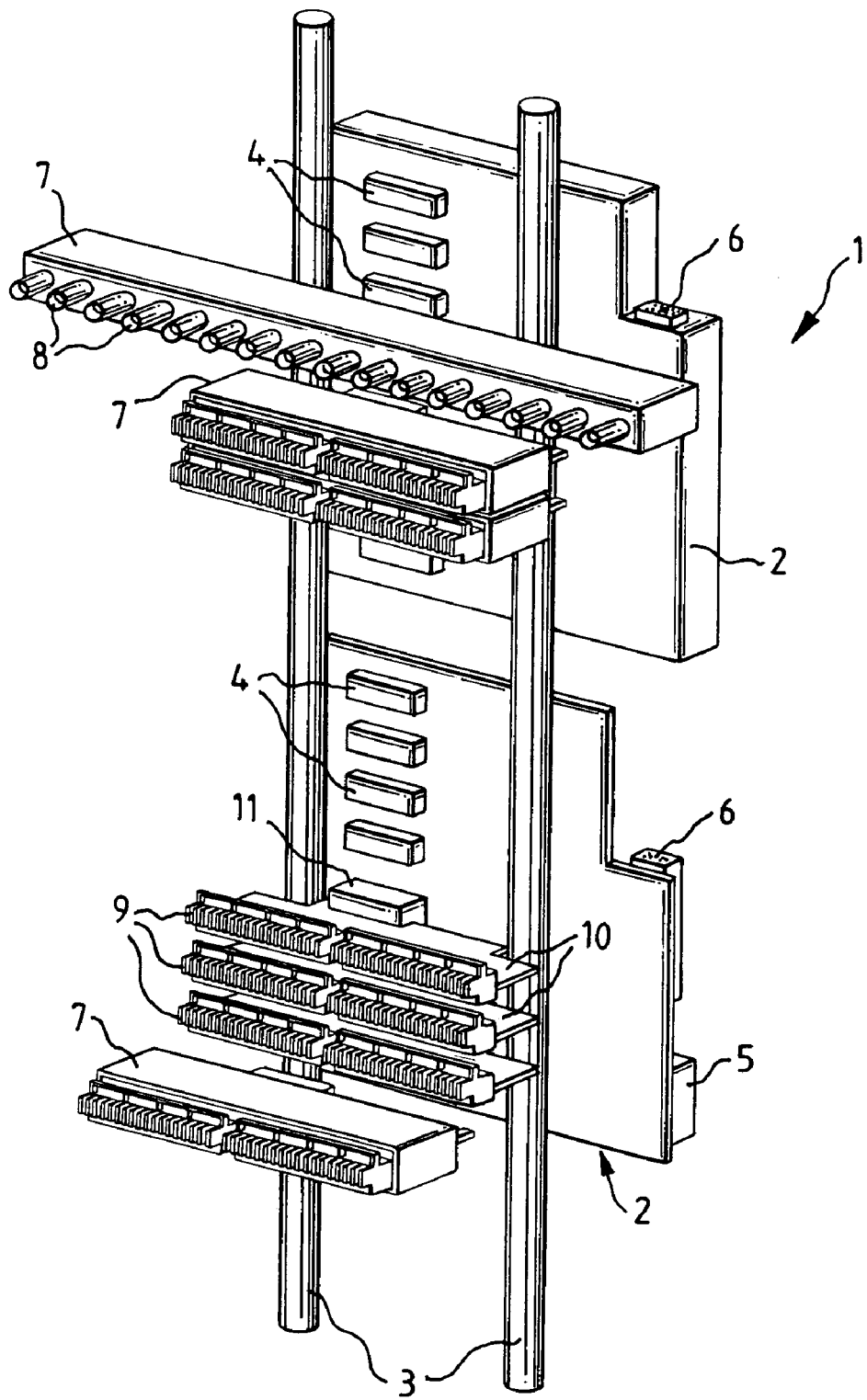

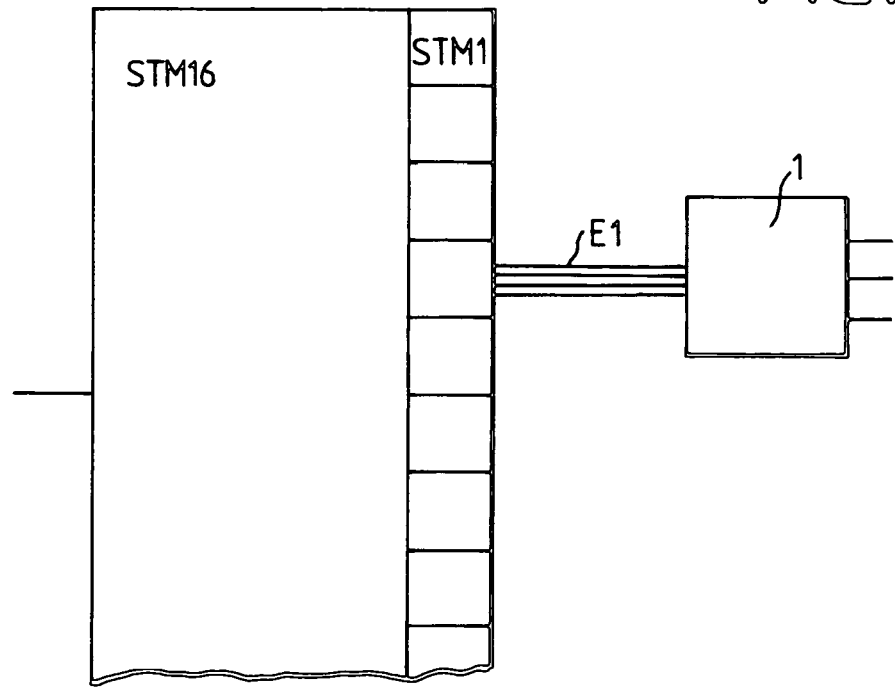
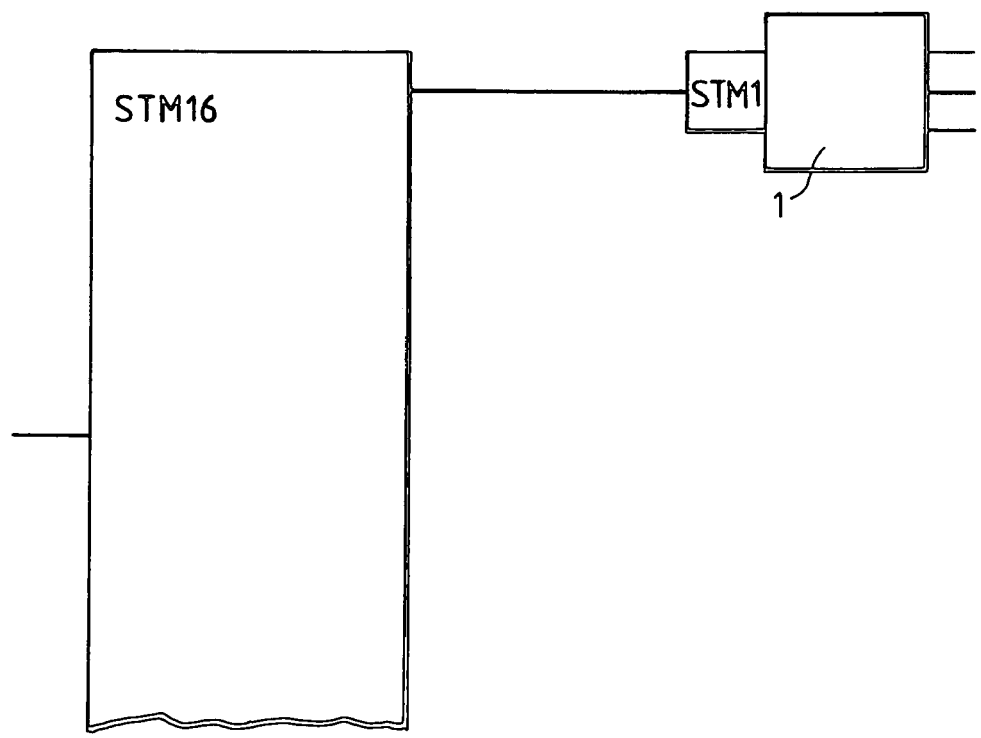

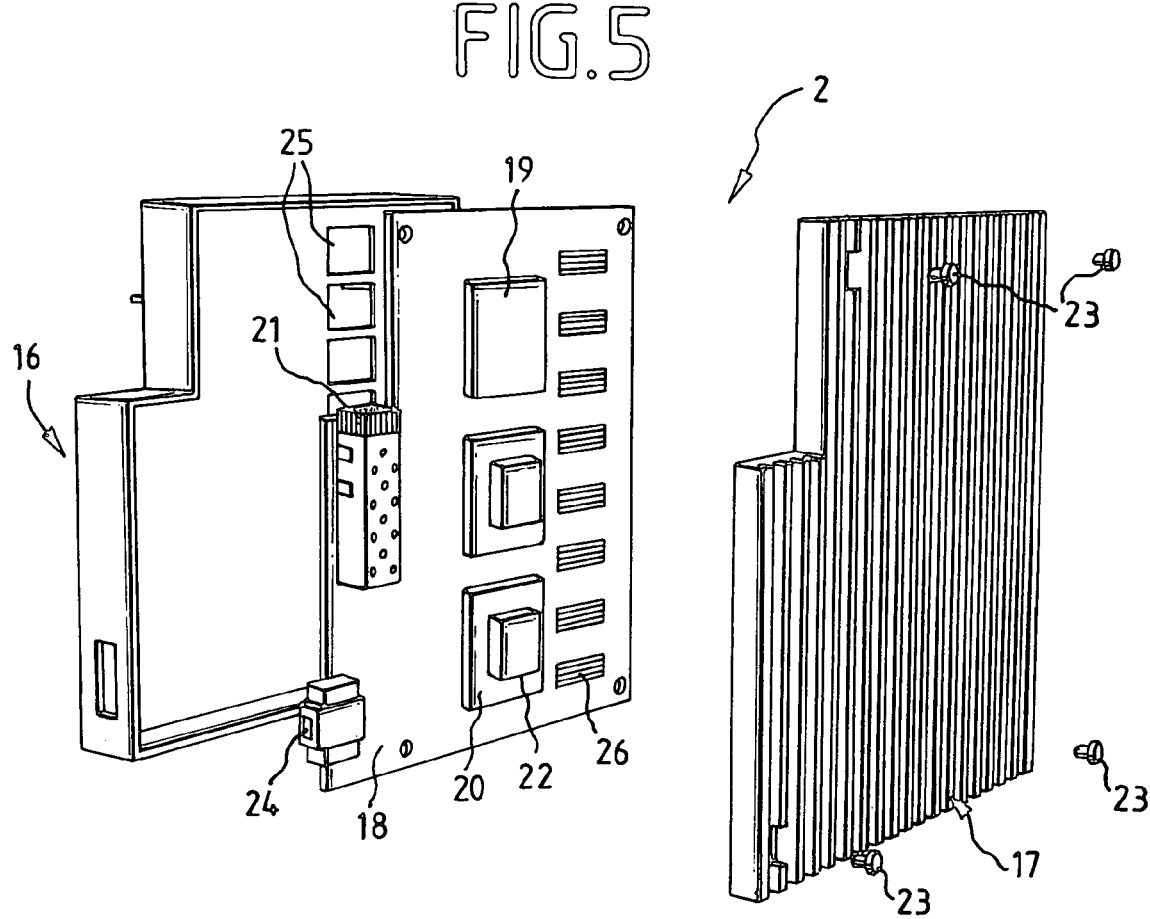
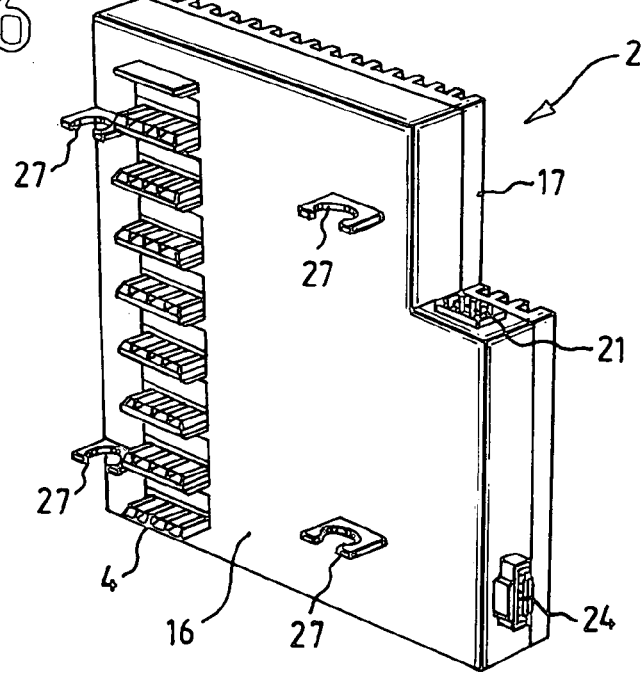

DISTRIBUTOR DEVICE FOR USE IN COMMUNICATION AND DATA SYSTEMS TECHNOLOGY

The invention relates to a distribution device for communications and data technology, and to an associated distribution board connection module and an associated connection module.

Known distribution devices are predominantly based on copper connection technology, with the conductors being connected as twisted pairs or as a coaxial cable. Owing to the constant increase in the amounts of data to be transmitted, optical data transmission is becoming increasingly important. In this case, the data is transmitted optically, with the data formats that are used largely being internationally standardized. The optical signals are in this case converted to electrical signals by means, for example, of SDH/SONET multiplexers, which, for example, down-multiplex a 2.5 Gigabit/s signal optically onto E1 cable with a transmission rate of about 2 Megabit/s. The E1 cables are then connected to the distribution device. The known SDH/SONET multiplexers in this case represent the active technology and convert the optical signal to an electrical signal for the passive distribution device. Owing to the fact that SDH/SONET multiplexers and a distribution device cannot always be installed in the immediate vicinity of one another, the large number of E1 cables to be laid represents an installation and cost problem.

The invention is therefore based on the technical problem of providing a distribution device for telecommunications and data technology, which simplifies installation.

For this purpose, the distribution device has at least one further connection module, with the connection module having at least one SDH/SONET transport interface and outputs for electrical signals, with the outputs of the connection module being connected to the inputs of the distribution board connection module, and with the connection module having at least one converter (SDH/SONET multiplexer) for conversion of SDH/SONET transport signals to E1 signals, and vice versa. In consequence, the SDH/SONET multiplex functionality is integrated in the distribution device, with the additional complexity in terms of the physical space being restricted to the connection module. However, in contrast, there is no need whatsoever to lay any E1 cables from the SDH/SONET multiplexer to the distribution device. In addition to the cost saving for the E1 cables, this also considerably simplifies installation since, for example, 63 E1 cables can be replaced by a single cable. In this case, the cable for the SDH/SONET transport signals may be in the form of an electrical cable or an optical fiber. The optical signals are converted to electrical signals and are then multiplexed onto the various channels in the connection module. In this case, it should be noted that the expressions input and output contacts have been chosen here only to assist orientation and relate to the transmission direction from the SDH/SONET multiplexer to the distribution device although, in reality, transmissions may also take place in the opposite direction.

In one preferred embodiment, the output contacts of the connection module and the input contacts of the distribution board connection module are in the form of multipole plug connectors. In this case, the expression multipole means a plug connector with at least 8 pins, but with the number of pins preferably being considerably greater. All of the connections for a distribution board connection module are preferably provided by means of just one plug connector.

In a further preferred embodiment, the connection module has an external supply voltage connection, via which the active technology within the connection module is supplied. Alternatively, the voltage may also be supplied by Ethernet cables.

In a further preferred embodiment, the connection module has an external interface for programming, via which, for example, the CPU or the program memory for the CPU can be programmed. The interface is in this case preferably in the form of an RJ 45 socket.

In a further preferred embodiment, the connection module has at least two plug connectors as output contacts for at least two distribution board connection modules, with one, and only one, plug connector preferably being associated with each distribution board connection module. Furthermore, the number of plug connectors is preferably an integer multiple of 2. It is thus possible, for example, for a single connection module to provide the signals for, for example, eight distribution board connection modules, and to pass these signals on. However, in principle, solutions with an external HUB are also feasible.

In a further preferred embodiment, the connection module and the distribution board connection module have snap-action elements for latching onto round rods. This on the one hand means that the modules can be moved easily and allows rotation about a round rod when the snap-action element is released from the other round rod. Furthermore, if required, a ground connection can easily be provided via the snap-action element, although the snap-action element must be composed of an electrically conductive material for this purpose.

In a further preferred embodiment, the housing of the connection module has heat sinks, which are preferably integrated in the housing. The heat sinks are, furthermore, preferably in the form of cooling ribs or cooling points. The embodiment with cooling points is preferably used when the connection module is intended to be mounted in different orientations, since this then ensures adequate convection, irrespective of the orientation.

The output contacts of the distribution board connection module are preferably in the form of insulation-displacement terminal contacts or coaxial plug connectors. However, other plug connectors, for example RJ 45, are also possible, depending on the application.

In a further preferred embodiment, the line drivers for the converter and SDH/SONET multiplexer for the connection module are arranged in the distribution board connection modules. If the converter is an STM1 board, then the associated line drivers and transformers are arranged in the distribution board connection module. This allows the connection modules to have a very compact physical form, making use of the physical space which is available in any case in the distribution board connection module.

In a further preferred embodiment, the voltage for the line drivers is supplied via at least one pole of the multipole plug connector, so that there is no need to provide any separate connection for the voltage supply, which is looped through from the connection module.

In a further preferred embodiment, the multipole plug connector for the distribution board connection module and/or the line drivers are/is arranged on a printed circuit board within the distribution board connection module.

In a further preferred embodiment, the output contacts of the distribution board connection module are in the form of an insulation-displacement terminal connecting strip. The insulation-displacement terminal contacts are preferably provided with fork contacts for this purpose, via which the electrical and mechanical connection is made to the printed circuit board. The insulation-displacement terminal connecting strip is in this case preferably designed such that the insulation-displacement terminal contacts are supported in the associated housing. This means that the insulation-displacement terminal contacts can be connected even before installation, and the fully connected insulation-displacement terminal connecting strip can be withdrawn, for example in order to replace a defective printed circuit board.

In a further preferred embodiment, the insulation-displacement terminal connecting strips have associated conductor guidance elements, which have channels which are routed on the sides of the conductor guidance element to the end face, with the channels preferably being designed such that all the necessary conductors can also be inserted on their own from one side.

Figure 4:
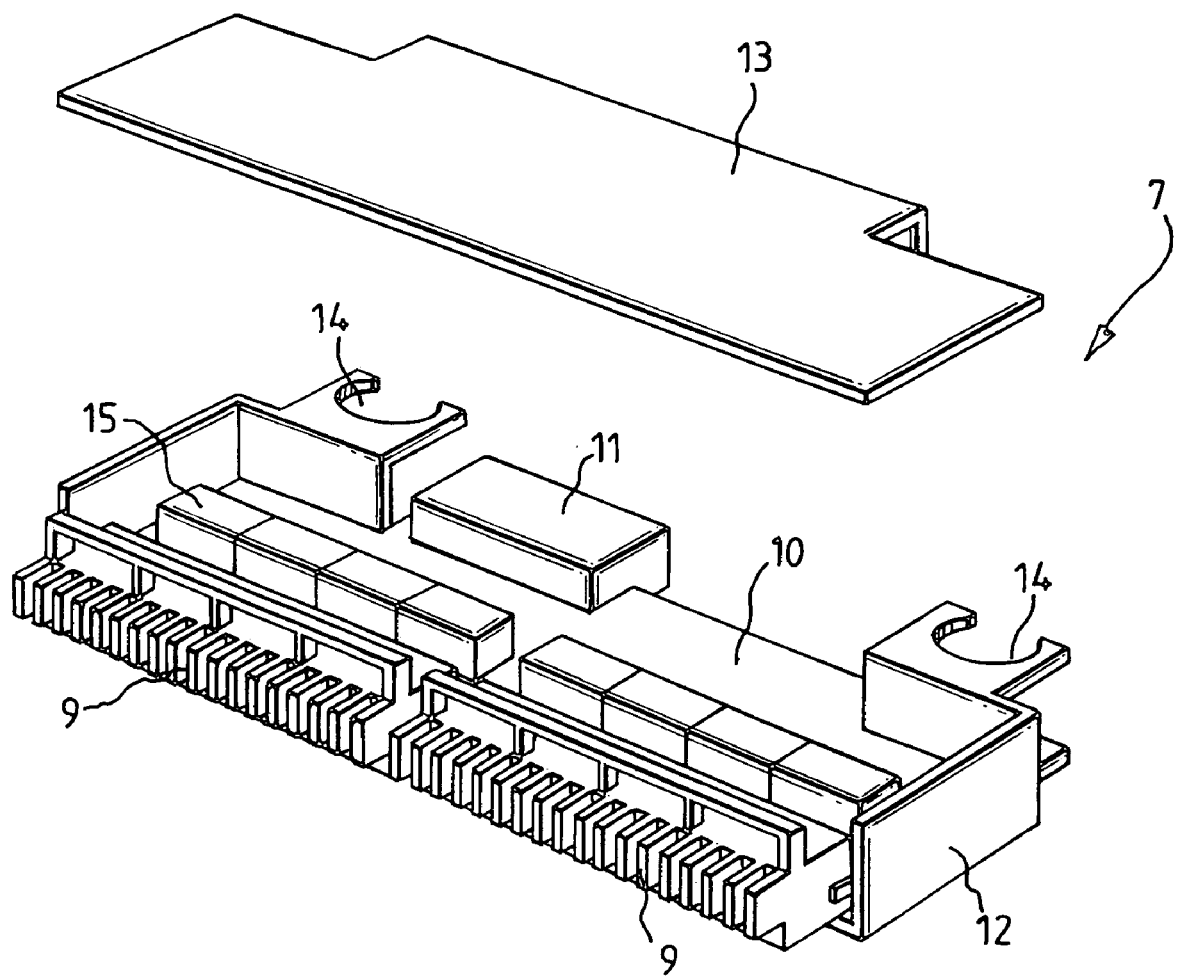
Figure 7:
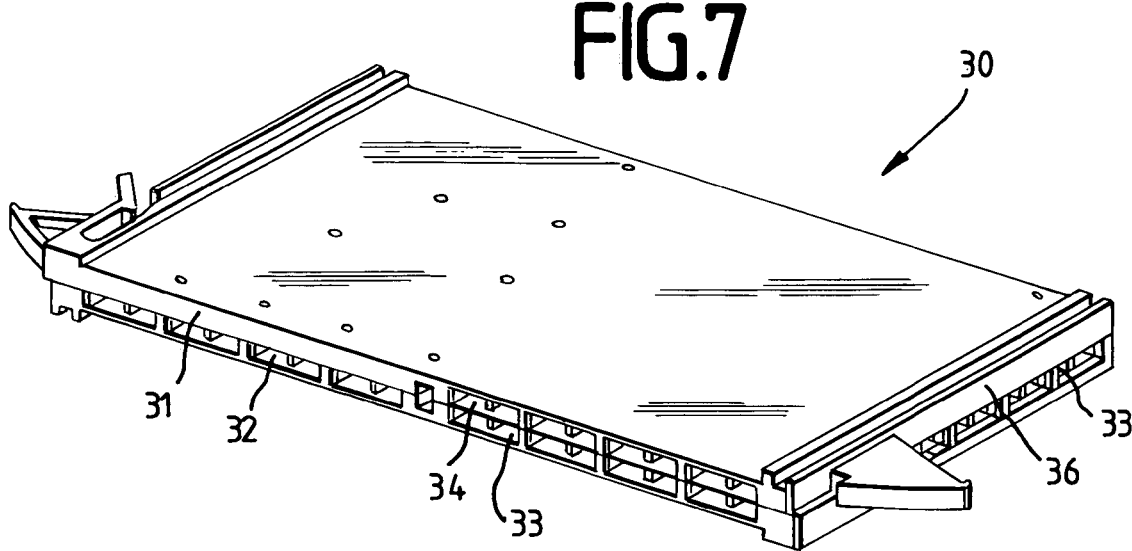
Figure 8:
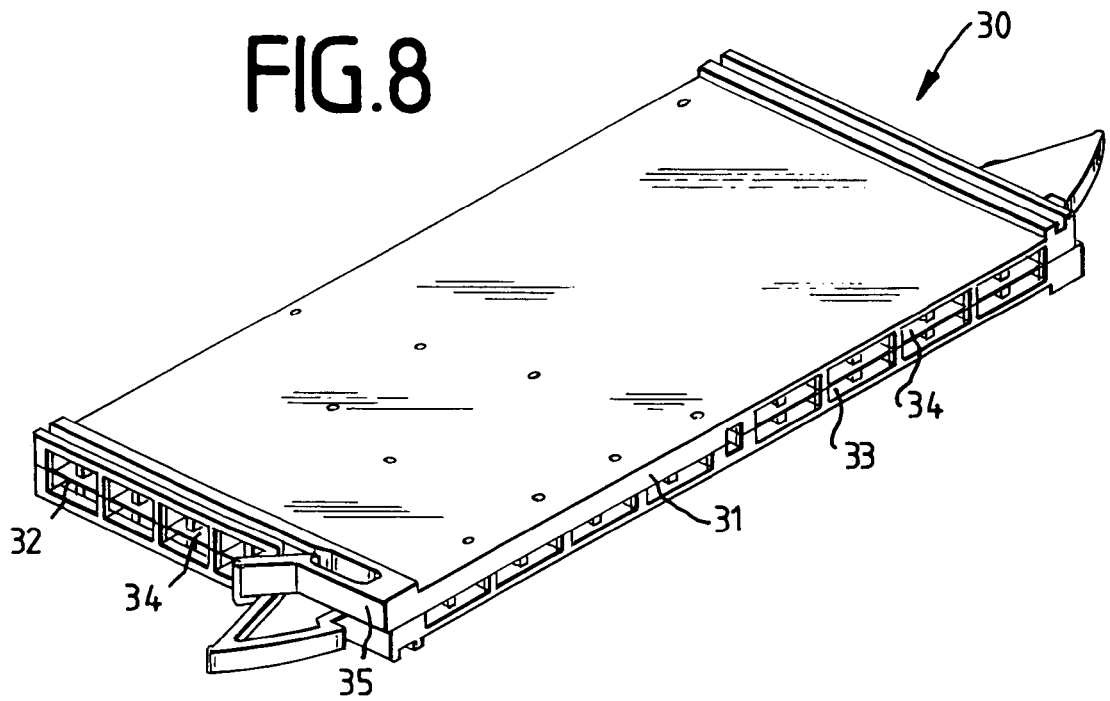

The invention will be explained in more detail in the following text with reference to one preferred exemplary embodiment. In the figures:

FIG. 1 shows an outline illustration of the transmission from an SDH/SONET multiplexer to a distribution device (prior art), FIG. 2 shows an outline illustration of the transmission according to the invention, FIG. 3 shows a perspective illustration of a distribution device according to the invention, FIG. 4 shows a perspective illustration of a distribution board connection module, FIG. 5 shows an exploded illustration of a connection module, FIG. 6 shows a perspective illustration of the connection module in the assembled state, FIG. 7 shows a first perspective illustration of a conductor guidance element, and FIG. 8 shows a second perspective illustration of the conductor guidance element.

The connection between an SDH/SONET multiplexer, for example an ADM (Add/Drop Multiplexer) and a distribution device 1 is illustrated schematically in FIG. 1. In this case, a broadband optical signal is multiplexed from STM16 boards to STM1 boards, with 63 E1 cables, for example, being connected to the output on one STM1 board, and being routed to the distribution device 1. Conversion to twisted pairs or coaxial outputs is then carried out in the distribution device 1. The entire active technology is in this case arranged in the SDH/SONET multiplexer while, in contrast, the distribution device contains only passive technology.

FIG. 2 now shows the fundamental principle of the invention, in which some of the active technology is moved from the SDH/SONET multiplexer to the distribution device 1. In consequence, the transmission between this "residual SDH/SONET multiplexer" and the distribution device can be carried out optically by means of optical waveguides, with the optical ↔ electrical conversion and the multiplexing process being carried out in the distribution device. One specific form of the integration will now be explained in more detail in the following text.

FIG. 3 shows a perspective illustration of a distribution device 1 according to the invention. The illustrated distribution device 1 has two connection modules 2, with the lower connection module 2 being illustrated without a housing rear wall. The connection modules 2 are latched onto round rods 3 via snap-action elements which cannot be seen. The connection modules 2 each have eight plug connectors 4, a supply voltage connection 5 and an SDH/SONET transport interface 6 for at least one optical waveguide. Furthermore, the distribution device 1 has two or more distribution board connection modules 7, with the upper distribution board connection module 7 having coaxial plug connectors 8 as output contacts while, in contrast, the lower distribution board connection modules 7 have insulation-displacement terminal connecting strips 9 as output contacts. The distribution board connection modules 7 are illustrated in the lower area without any housings, so that it is possible to see a printed circuit board 10, which is arranged in the interior of the distribution board connection module 7 and onto which the insulation-displacement terminal connecting strips 9 are plugged. A plug connector 11 is arranged on the opposite side of the printed circuit board 10. In this case, the plug connector 11 forms a plug connection with the plug connector 4.

FIG. 4 shows the distribution board connection module 7 in detail. The distribution board connection module 7 has a housing which comprises a lower part 12 and a cover 13, with the cover 13 also having parts of a rear wall. The lower part 12 comprises a base plate, side walls as well as parts of the rear wall, on which the snap-action elements 14 for latching onto the round rods 3 are formed. The snap-action elements 14 may in this case either be formed integrally from the lower part 12 or else may be separate elements which, if necessary, may be connected to the printed circuit board 10 in order, for example, to provide a ground connection via the round rods. The plug connector 11 as well as eight transformers 15 are arranged on the printed circuit board 10. Furthermore, eight line drivers, which are preferably in the form of discrete SMD components, are arranged on the printed circuit board 10. In addition, there are terminating resistors on the printed circuit board 10.

The connection module 2 is illustrated in an exploded form schematically in FIG. 5. The connection module 2 has a first housing part 16 and a housing rear wall 17 as well as a printed circuit board 18. All of the active technology of an STM1 board with the exception of the transformer and line drivers is fitted on the printed circuit board 18, since the latter are arranged in the distribution board connection module 7. The active technology comprises a CPU 19, two multiplexers 20 as well as an interface 21 for connection of at least one optical waveguide. The optical signal is converted to an electrical signal and is split via the multiplexer between the individual pins of the eight plug connectors 4. In a corresponding manner, the incoming electrical signals are multiplexed to form an optical signal, via the other multiplexer 20. Owing to the high power losses, the two multiplexers 20 have associated heat sinks 22, with the heat losses being dissipated via the housing rear wall 17. For this purpose, the housing rear wall 17 has cooling ribs or cooling points, and the housing rear wall 17 can be screwed to the printed circuit board 18 by means of screws 23. The connection module 2 also has an interface 24 for an external voltage supply, as well as DC/DC converters, which are not illustrated, for transformation of the input voltage of, for example, 48 V to the 3.3 V supply voltage for the active technology, and for transformation of the 3.3 V to 2.5 V for specific elements. The connection module 2 also has a programming interface, which is not illustrated, in order, for example, to program the program memory for the CPU 19. Openings 25 can be seen in the housing part 16, through which the plug connectors 4 which are arranged on the rear face of the printed circuit board 18 are externally accessible, and associated conductor tracks 26 for the plug connectors 4 can be seen on the printed circuit board 18 that is illustrated. FIG. 6 shows the connection module 2 in the assembled state, with the housing part 16 being cut away in the area of the plug connector 4.

In this case, the snap-action elements 27 are arranged on the printed circuit board 18. The plug connectors 4 are in this case, for example, in the form of 48-pole standard plug connectors, with specific pins, defined in advance, being used for signal transmission and the remaining pins being used for supply voltage transmission and for the ground connection.

A large number of distribution board connection modules 7 are normally arranged in one distribution device 1, so that a correspondingly large number of conductors have to be handled. Each distribution board connection module 7 therefore preferably has one associated conductor guidance element 30, which is arranged above or below the distribution board connection module 7. A conductor guidance element 30 such as this is illustrated in FIGS. 7 and 8. For this purpose, the conductor guidance element 30 is formed on the end face 31 with 24 channels 32-34, which are routed within the conductor guidance element on the sides 35, 36. In this case, 16 channels are in each case required for a 16 DA connecting strip. Depending on the accessibility to the channels, either the channels 32 and 33 or the channels 32 and 34 are used in this case, so that the conductor guidance element 30 ensures that the conductors are routed in a defined manner, irrespective of the orientation of the installation of the distribution device 1.

LIST OF REFERENCE SYMBOLS

| | |
|---|---|
| 1 | Distribution device |
| 2 | Connection modules |
| 3 | Round rods |
| 4 | Plug connector |
| 5 | Supply voltage connection |
| 6 | Interface |
| 7 | Distribution board connection modules |
| 8 | Coaxial plug connector |
| 9 | Insulation-displacement terminal connecting strips |
| 10 | Printed circuit board |
| 11 | Plug connector |
| 12 | Lower part |
| 13 | Cover |
| 14 | Snap-action elements |
| 15 | Transformers |
| 16 | Housing part |
| 17 | Housing rear wall |
| 18 | Printed circuit board |
| 19 | CPU |
| 20 | Multiplexer |
| 21 | Interface |
| 22 | Heat sink |
| 23 | Screws |
| 24 | Interface |
| 25 | Openings |
| 26 | Conductor tracks |
| 27 | Snap-action elements |
| 30 | Conductor guidance element |
| 31 | End face |
| 32-34 | Channels |
| 35, 36 | Sides |

The invention claimed is:

1. A distribution device for communications and data technology, comprising:
   at least one distribution board connection module, with the distribution board connection module having a housing in which externally accessible input and output contacts are arranged for connection of lines, cables or conductors,
   wherein the distribution device has at least one connection module, with the connection module having at least one SDH/SONET transport interface and outputs for electrical signals, with the outputs of the connection module being connected to the input contacts of the distribution board connection module, and with the connection module having at least one converter for conversion of SDH/SONET transport signals to E1 signals, and vice versa.

2. The distribution device as claimed in claim 1, wherein the outputs of the connection module and the input contacts of the distribution board connection module are in the form of multipole plug connectors.

3. The distribution device as claimed in claim 1, wherein the connection module has an external supply voltage connection.

4. The distribution device as claimed in claim 1, wherein the connection module has an external interface for programming.

5. The distribution device as claimed in claim 1, wherein the connection module has at least two plug connectors as output contacts for at least two distribution board connection modules.

6. The distribution device as claimed in claim 1, wherein the connection module and the distribution board connection module have snap-action elements for latching onto round rods.

7. The distribution device as claimed in claim 1, wherein the connection module includes a housing having heat sinks.

8. The distribution device as claimed in claim 7, wherein the heat sinks are in the form of cooling ribs or cooling points.

9. The distribution device as claimed claim 1, wherein the output contacts of the distribution board connection module are in the form of insulation-displacement terminal contacts or coaxial plug connectors.

10. The distribution device as claimed in claim 2, further comprising line drivers wherein the line drivers for the converter for the connection module are arranged in the distribution board connection modules.

11. The distribution device as claimed in claim 10, wherein voltage for the line drivers is supplied via at least one pole of the multipole plug connector.

12. The distribution device as claimed in claim 10, wherein the multipole plug connector and/or the line drivers are/is arranged on a printed circuit board.

13. The distribution device as claimed in claim 9, wherein the output contacts of the distribution board connection module are in the form of an insulation-displacement terminal connecting strip.

14. The distribution device as claimed in claim 13, wherein the insulation-displacement terminal connecting strip is connected to the printed circuit board via fork contacts.

15. The distribution device as claimed in claim 13, wherein the insulation-displacement terminal connecting strips have associated conductor guidance elements.

16. The distribution device as claimed in claim 15, wherein the conductor guidance element has channels at sides thereof, which lead to an end face of the conductor guidance element.

17. The distribution device as claimed in claim 16, wherein the channels are arranged on both sides of the conductor guidance element.

18. The distribution device as claimed in claim 17, wherein channels are arranged one above the other on one half of the end surface of the conductor guidance element, with the upper and lower channels being routed on different sides of the conductor guidance element, and the channels in the other half of the end surface being routed on only one side, with the channels on the one side being arranged one above the other for both halves of the end surface.

19. A connection module for a distribution device, comprising:
   a housing,
   an SDH/SONET transport interface, and
   an output for an electrical signal, with a converter for conversion of SDH/SONET transport signals to E1 signals, and vice versa, being arranged between the input and the output within the housing:

wherein the connection module has snap-action elements for latching onto round rods.

20. The connection module as claimed in claim 19, wherein the converter is an STM1 board.

21. The connection module as claimed in claim 19, wherein the output includes at least one multipole plug connector.

22. The connection module as claimed in claim 19, wherein the connection module has an external supply voltage connection.

23. The connection module as claimed in claim 19, wherein the connection module has an external interface for programming.

24. The connection module as claimed in claim 19, wherein the connection module has at least two plug connectors as output contacts for at least two distribution board connection modules.

25. The connection module as claimed in claim 19, wherein the housing of the connection module has heat sinks.

26. The connection module as claimed in claim 25, wherein the heat sinks are in the form of cooling ribs or cooling points.

27. A distribution board connection module for a distribution device for communications and data technology, comprising:

a housing in which externally accessible input and output contacts are arranged for connection of lines, cables or conductors, with the input contacts being in the form of a multipole plug connector and the output contacts being in the form of insulation-displacement terminal contacts or coaxial plug connectors, with functional elements being arranged electrically between the input and output contacts in the housing, wherein the functional elements are in the form of line drivers for an STM1 board, and wherein an external voltage supply for the line drivers can be connected via at least one pin of the multipole plug connector.

* * * * *